United States Patent
Sone et al.

(10) Patent No.: US 12,208,753 B2
(45) Date of Patent: Jan. 28, 2025

(54) WIRING MODULE AND WIRING MODULE SET

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Kosuke Sone, Mie (JP); Hiroki Hirai, Mie (JP); Makoto Higashikozono, Mie (JP); Yasuyuki Yamamoto, Mie (JP); Ai Takehisa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 200 days.

(21) Appl. No.: 17/919,679

(22) PCT Filed: Feb. 5, 2021

(86) PCT No.: PCT/JP2021/004342
§ 371 (c)(1),
(2) Date: Oct. 18, 2022

(87) PCT Pub. No.: WO2021/220573
PCT Pub. Date: Nov. 4, 2021

(65) Prior Publication Data
US 2023/0182658 A1 Jun. 15, 2023

(30) Foreign Application Priority Data
Apr. 30, 2020 (JP) ................. 2020-080415

(51) Int. Cl.
H02G 3/02 (2006.01)
B60R 16/02 (2006.01)
H02G 3/30 (2006.01)

(52) U.S. Cl.
CPC ............... B60R 16/02 (2013.01); H02G 3/30 (2013.01)

(58) Field of Classification Search
None
See application file for complete search history.

(56) References Cited

U.S. PATENT DOCUMENTS 5,742,005 A * 4/1998 Saka .................... B60R 16/0238
174/541
5,771,575 A * 6/1998 Onizuka ................. B60K 35/60
174/72 A (Continued)

FOREIGN PATENT DOCUMENTS

JP 2001-130347 5/2001
JP 2001130347 A * 5/2001 .............. B60J 7/022

(Continued)

OTHER PUBLICATIONS

Office Action issued in Corresponding JP Patent Application No. 2022-518609, dated Jan. 16, 2024, along with an English translation thereof.

(Continued)

*Primary Examiner* — Krystal Robinson
(74) *Attorney, Agent, or Firm* — GREENBLUM & BERNSTEIN, P.L.C.

(57) ABSTRACT

A wiring module includes: a functional sheet disposed between a roof panel forming a roof part of a vehicle and an interior member forming a ceiling shape of a vehicle interior to planarly extend over the roof panel and the interior member; a transmission member provided to the functional sheet; a roof-side apparatus provided to the functional sheet;

(Continued)

and a rigid member provided to the functional sheet, wherein the functional sheet includes a layer having at least one selected from the group consisting of a heat insulation function, an acoustic insulation function, and a radio wave shielding function, and at least one end of the transmission member is provided along a wiring route connected to the roof-side apparatus in the functional sheet.

6 Claims, 11 Drawing Sheets

(56) References Cited

U.S. PATENT DOCUMENTS

| | | | |
|---|---|---|---|
| 6,582,013 | B1 | 6/2003 | Inoue et al. |
| 2002/0041110 | A1* | 4/2002 | Odashima ............. B60J 5/0416 296/146.7 |
| 2012/0055966 | A1 | 3/2012 | Abe et al. |

FOREIGN PATENT DOCUMENTS

| | | |
|---|---|---|
| JP | 2006-205825 | 8/2006 |
| JP | 2016-196216 | 11/2016 |
| JP | 2018-090229 | 6/2018 |
| JP | 2018090229 A * | 6/2018 |
| JP | 2018-207625 | 12/2018 |
| WO | 2011/016088 | 2/2011 |

OTHER PUBLICATIONS

International Search Report issued in International Pat. Appl. No. PCT/JP2021/004342, dated Mar. 16, 2021, along with an English translation thereof.

International Preliminary Report on Patentability issued in International Pat. Appl. No. PCT/JP2021/004342, dated Nov. 3, 2022, along with an English translation thereof.

Office Action issued in Corresponding JP Patent Application No. 2022-518609, dated Aug. 22, 2023, along with an English translation thereof.

Office Action issued in Corresponding JP Patent Application No. 2022-518609, dated Jul. 30, 2024, along with an English translation thereof.

* cited by examiner

F I G 2
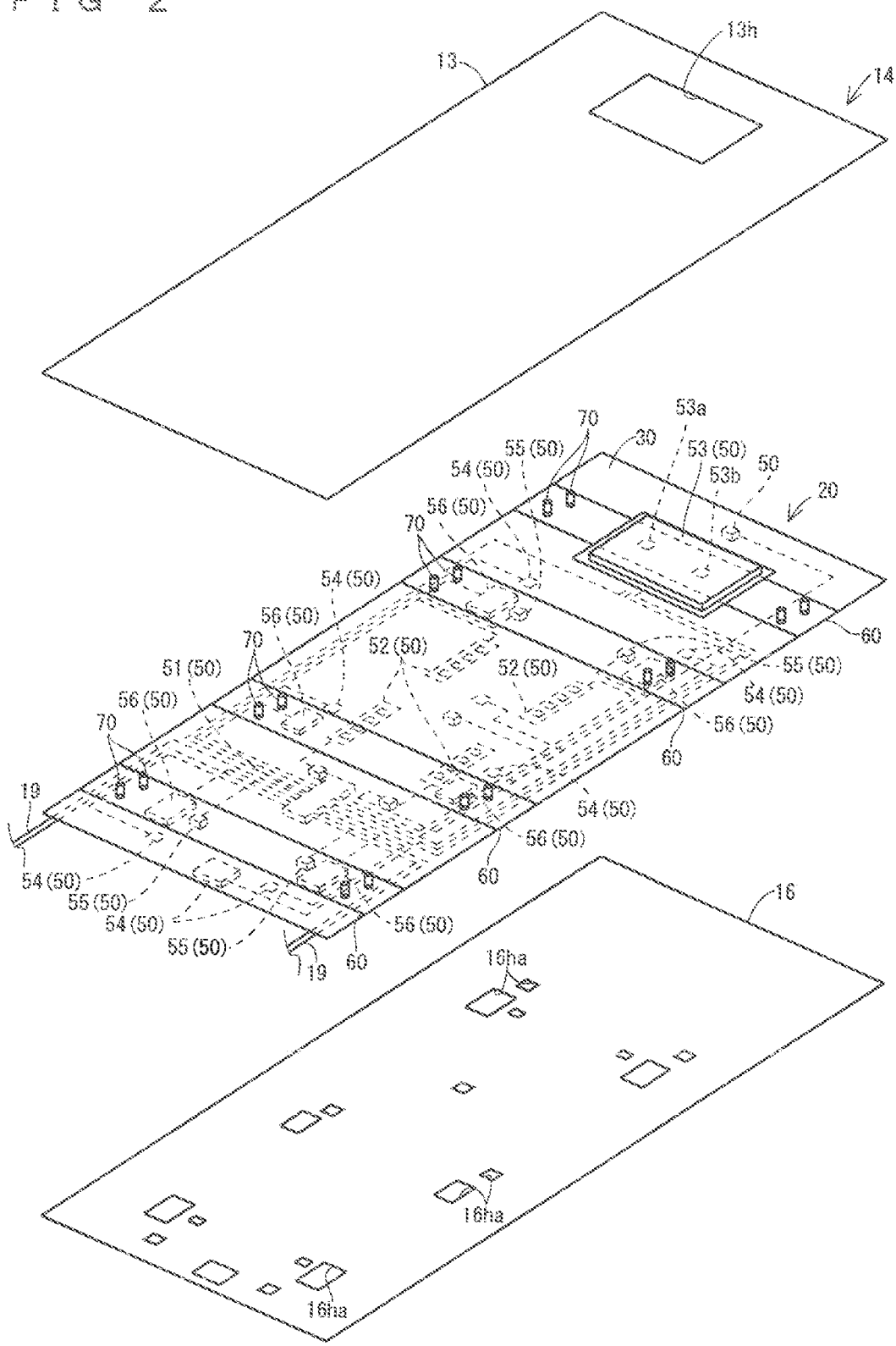

F I G. 9
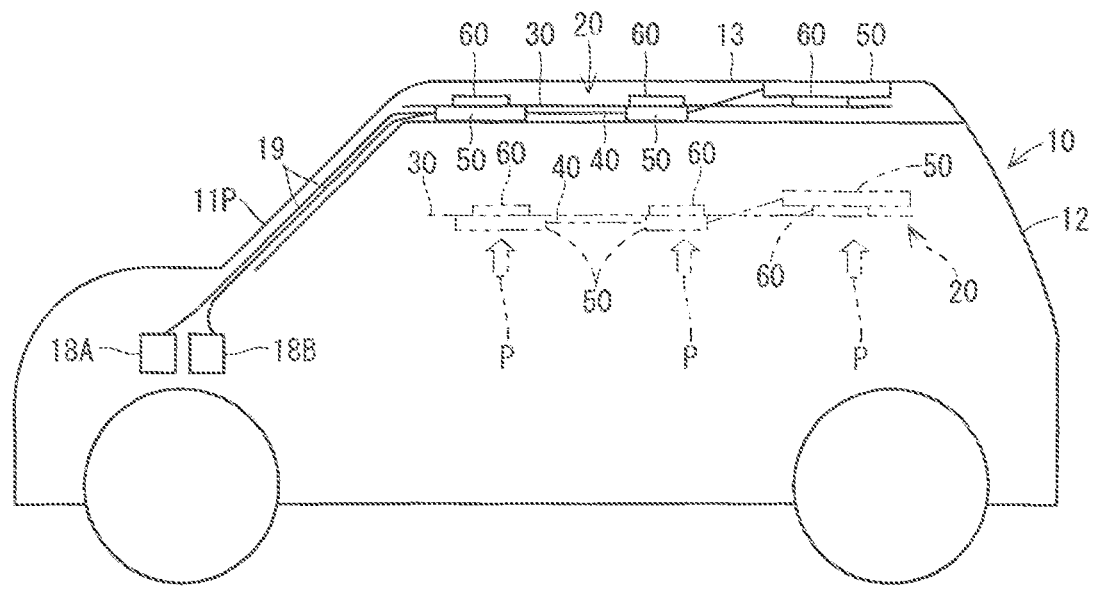

WIRING MODULE AND WIRING MODULE SET

TECHNICAL FIELD

The present disclosure relates to a wiring module and a wiring module set.

BACKGROUND ART

Patent Document 1 discloses a wire harness assembly body assembled to a body of a vehicle. The wire harness assembly body includes a sheet-like acoustic insulation material, a sheet-like protection material stacked on the acoustic insulation material, and a wire harness having at least one electrical wire routed between the acoustic insulation material and the protection material.

Patent Document 2 discloses a laying structure of a wiring module including a panel member, a wiring module, and a panel peripheral component. The wiring module includes a sheet-like member and at least one electrical wire. The sheet-like member is laid on a main surface of the panel member. At least one electrical wire is fixed to the sheetlike member so that the sheet-like member is disposed along a predetermined wiring route in a state where the sheet-like member is laid on a main surface of the panel member. The panel peripheral component is provided to a constant position with respect to the panel member to position the wiring module on the panel member.

PRIOR ART DOCUMENTS

Patent Document(s)

Patent Document 1: Japanese Patent Application Laid-Open No. 2018-090229
Patent Document 2: Japanese Patent Application Laid-Open No. 2018-207625

SUMMARY

Problem to be Solved by the Invention

The wire harness or the wiring module described above may extend widely on a roof part of a vehicle in some cases. It is desired that such a wire harness or a wiring module is easily incorporated into the roof part of the vehicle.

It is also desired to easily deal with a difference of grade or presence or absence of an optional component, for example.

A first object of the present disclosure is to provide a technique capable of easily incorporating a wiring module to a roof part of a vehicle.

A second object of the present disclosure is to provide a technique capable of easily dealing with a difference of grade or presence or absence of an optional component, for example.

Means to Solve the Problem

A wiring module according to the present disclosure is a wiring module including: a functional sheet disposed between a roof panel forming a roof part of a vehicle and an interior member forming a ceiling shape of a vehicle interior to planarly extend over the roof panel and the interior member; a transmission member provided to the functional sheet; a roof-side apparatus provided to the functional sheet; and a rigid member provided to the functional sheet, wherein the functional sheet includes a layer having at least one selected from the group consisting of a heat insulation function, an acoustic insulation function, and a radio wave shielding function, and at least one end of the transmission member is provided along a wiring route connected to the roof-side apparatus in the functional sheet.

A wiring module set according to the present disclosure is a wiring module set including a wiring module and an interior member side wiring module, the wiring module including: a functional sheet disposed between a roof panel forming a roof part of a vehicle and an interior member forming a ceiling shape of a vehicle interior to planarly extend over the roof panel and the interior member; a transmission member provided to the functional sheet; and a roof-side apparatus provided to the functional sheet, wherein the functional sheet includes a layer having at least one selected from the group consisting of a heat insulation function, an acoustic insulation function, and a radio wave shielding function, and at least one end of the transmission member is provided along a wiring route connected to the roof-side apparatus in the functional sheet, and the interior member side wiring module including an interior member side transmission member provided to the interior member.

Effects of the Invention

According to the wiring module of the present disclosure, the wiring module is easily incorporated into a roof part of the vehicle.

The wiring module set of the present disclosure can easily deal with a difference of grade and presence or absence of an optional component, for example.

BRIEF DESCRIPTION OF DRAWINGS

FIG. 2 is a perspective view illustrating the wiring module.
FIG. 9 is a schematic explanation view illustrating a position of the wiring module in the vehicle.

DESCRIPTION OF EMBODIMENT(S)

Description of Embodiment of Present Disclosure

Figure 1:
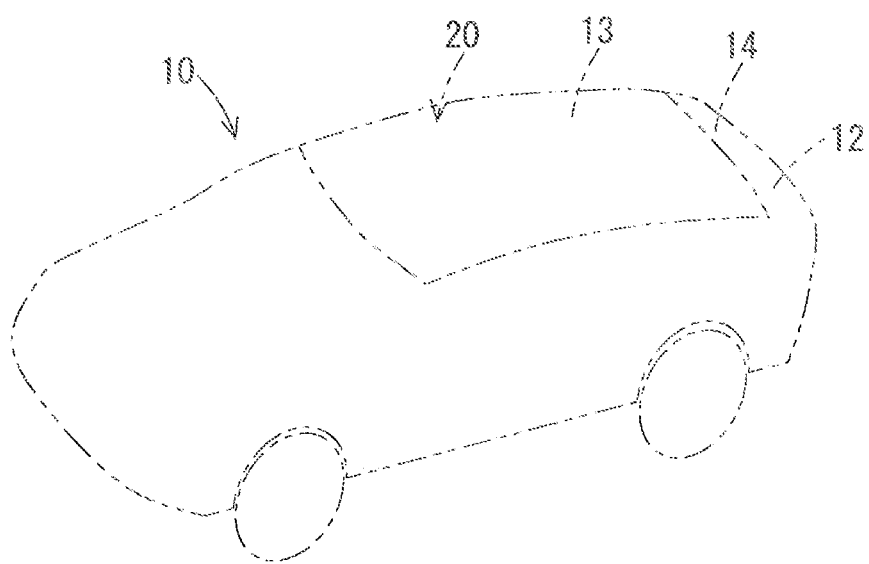
FIG. 1 is a schematic perspective view illustrating a vehicle into which a wiring module is incorporated.

Embodiments of the present disclosure are listed and described firstly.

A wiring module according to the present disclosure is as follows.

(1) A wiring module includes: a functional sheet disposed between a roof panel forming a roof part of a vehicle and an interior member forming a ceiling shape of a vehicle interior to planarly extend over the roof panel and the interior member; a transmission member provided to the functional sheet; a roof-side apparatus provided to the functional sheet; and a rigid member provided to the functional sheet, wherein the functional sheet includes a layer having at least one selected from the group consisting of a heat insulation function, an acoustic insulation function, and a radio wave shielding function, and at least one end of the transmission member is provided along a wiring route connected to the roof-side apparatus in the functional sheet. According to the present disclosure, a part of the functional sheet provided with the rigid member hardly hangs downward. Accordingly, the wiring module is easily incorporated into a roof part of the vehicle.

(2) In the wiring module according to (1), it is also applicable that the roof-side apparatus includes a support target roof-side apparatus, and the rigid member is provided in a region of the functional sheet, the region provided with the support target roof-side apparatus. Accordingly, the support target roof-side apparatus is firmly supported by the rigid member.

(3) In the wiring module according to (1) or (2), the rigid member may include a roof fixing part fixed to a roof part of the vehicle. Accordingly, the rigid member is firmly fixed to the roof part via the roof fixing part.

(4) In the wiring module according to (3), the roof fixing part may include a holding hole supporting a fitting fixing part fitted in and fixed to the roof part of the vehicle while allowing movement of the fitting fixing part in a direction in which the functional sheet extends. Accordingly, the fitting fixing part is supported by the holding hole while the movement thereof is allowed in the direction in which the functional sheet extends. Accordingly, the fitting fixing part can be easily fitted in and tried to the roof part.

A wiring module set according to the present disclosure is as follows.

(5) A wiring module set includes: an interior member side wiring module including an interior member side transmission member provided to an interior member forming a ceiling shape of a vehicle interior; and the wiring module according to any one of (1) to (4). Accordingly, the interior member side transmission member in the interior member side wiring module and the transmission member in the wiring module can be separately incorporated into the roof part of the vehicle. Accordingly, it is possible to easily deal with a difference of grade or presence or absence of an optional component, for example.

(6) A wiring module set includes a wiring module and an interior member side wiring module, the wiring module including: a functional sheet disposed between a roof panel forming a roof part of a vehicle and an interior member forming a ceiling shape of a vehicle interior to planarly extend over the roof panel and the interior member; a transmission member provided to the functional sheet; and a roof-side apparatus provided to the functional sheet, wherein the functional sheet includes a layer having at least one selected from the group consisting of a heat insulation function, an acoustic insulation function, and a radio wave shielding function, and at least one end of the transmission member is provided along a wiring route connected to the roof-side apparatus in the functional sheet, and the interior member side wiring module including an interior member side transmission member provided to the interior member. It is possible to easily deal with a difference of grade or presence or absence of an optional component, for example.

(7) In the wiring module set according to (6), it is also applicable that the interior member side transmission member is a member connected to a roof-side apparatus incorporated regardless of a grade of a vehicle and presence or absence of an option, and the transmission member is a member connected to a roof-side apparatus which is or is not incorporated in accordance with a grade of a vehicle and presence or absence of an option.

(8) In the wiring module set according to (6) or (7), the interior member side transmission member may be a member connected to a roof-side apparatus fixed to any of the roof panel, a frame supporting the roof panel and the interior member.

Details of Embodiment of Present Disclosure

Specific examples of a wiring module and a wiring module set of the present disclosure are described hereinafter with reference to the drawings. The present disclosure is not limited to these examples, but is indicated by claims, and it is intended that meanings equivalent to claims and all modifications within a scope of claims are included.

Embodiment 1

A wiring module according to an embodiment 1 is described hereinafter.
<Vehicle into which Wiring Module is Incorporated>

FIG. 1 is a schematic perspective view illustrating a vehicle 10 into which a wiring module 20 is incorporated. The vehicle 10 includes a body 12. The body 12 is a part forming an outer shape of the vehicle 10. The body 12 may be a monocoque body or a body mounted on a ladder type frame. Herein, the body 12 includes a lateral panel surrounding a vehicle interior, a roof panel 13, a boarding door panel for a passenger to get in or out of a vehicle, and a rear door panel to take in and out a luggage, for example. The body 12 may be formed by metal or resin. The body 12 may also be made of a combination of metal and resin. A plate-like part of the body 12 covering an upper side of the vehicle interior constitutes the roof panel 13. That is to say, the roof panel 13 forms a roof part of the vehicle 10. The roof panel 13 may be partially or wholly curved to form an appearance shape of the body 12. The roof panel 13 may be formed by metal or resin. The roof panel 13 may also be made of a combination of metal and resin. Herein, an antenna hole 13h is formed in the roof panel 13 (refer to FIG. 2).

The wiring module 20 is incorporated into the vehicle 10. In the example described in the present embodiment, the wiring module 20 is incorporated into a roof part 14 including the roof panel 13.

Figure 3:
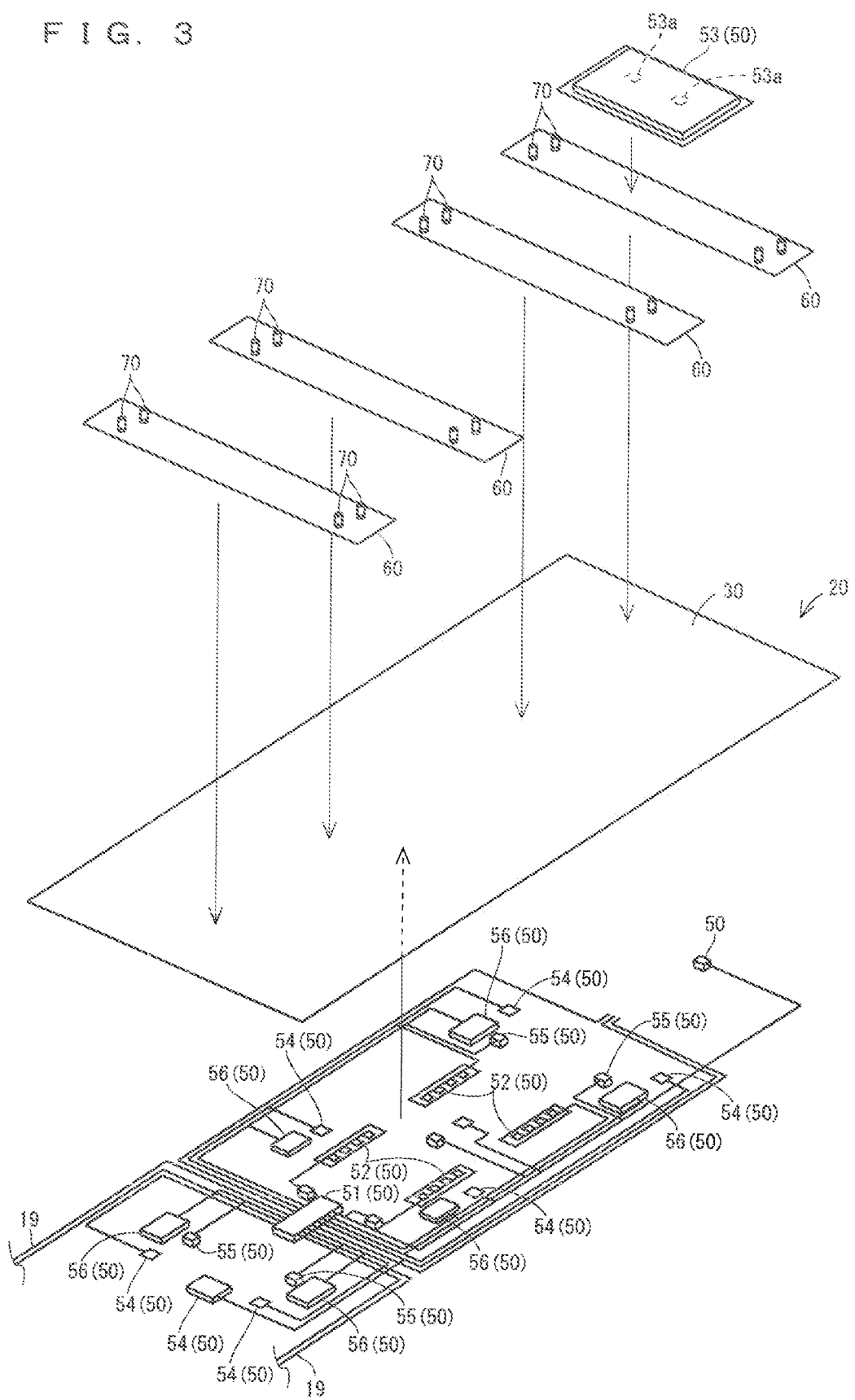
FIG. 3 is an exploded perspective view illustrating the wiring module.

FIG. 2 is a perspective view illustrating the wiring module 20. FIG. 2 illustrates the roof part 14. FIG. 3 is an exploded perspective view illustrating the wiring module 20. Transmission members illustrated in FIG. 2 and FIG. 3 indicate schematic routes, thus there may be a case where each of them includes a plurality of electrical wires even when it is illustrated as a single wire. The roof panel 13 described above and an interior member 16 are illustrated as the roof part 14. The roof part 14 may include a frame supporting the roof panel 13 in some cases. The interior member 16 is a plate-like member formed of resin, for example. The interior member 16 is a part forming a ceiling shape of the vehicle interior. The interior member 16 may be partially or wholly curved. The interior member 16 is attached to a lower side of the roof panel 13. The interior member 16 is a part exposed to the vehicle interior. The interior member 16 is also referred to as a roof liner in some cases. In the present embodiment, the wiring module 20 is provided between the roof panel 13 and the interior member 16.

<Whole Structure of Wiring Module>

The wiring module 20 includes a functional sheet 30, a transmission member 40, a roof-side apparatus 50, and a rigid member 60.

The functional sheet 30 includes a layer having at least one selected from the group consisting of a heat insulation function, an acoustic insulation function, and a radio wave shielding function. That is to say, the functional sheet 30 is a sheet to which the transmission member 40, the roof-side apparatus 50, and the rigid member 60 are fixed, and having at least one selected from the group consisting of the heat insulation function, the acoustic insulation function, and the radio wave shielding function. A specific example of the functional sheet 30 having these functions is described hereinafter.

The functional sheet 30 is incorporated into the roof part 14 to planarly extend over the roof panel 13 and the interior member 16. For example, the functional sheet 30 may be disposed to cover 80% or more of an area of the roof part 14. For example, the functional sheet 30 may be disposed to extend over a whole upper side of head rests of a plurality of passenger seats in the vehicle. The functional sheet 30 is disposed to extend over the roof part 14, thus can support the transmission member 40 and the roof-side apparatus 50 in a region in the roof part 14 as large as possible. The function of the functional sheet 30 can be performed on a region in the roof part 14 as large as possible.

The transmission member 40 is a member transmitting electrical power or light, for example, and is a member in which at least one end thereof is provided along a wiring route connected to the roof-side apparatus 50 in the functional sheet 30. For example, the transmission member 40 may be a general wire having a core wire and a covering around the core wire, or may also be a bare conductive wire, a shielded wire, an electrical cable, an enamel wire, a nichrome wire, a coaxial wire, or an optical fiber. That is to say, the transmission member 40 may be a wire-like member transmitting electrical power. The wire-like member transmitting the electrical power may be various kinds of signal lines or various kinds of power lines. The wire-like member transmitting the electrical power may be a single wire-like object or a composite object of a plurality of wire-like objects (a twisted wire and a cable made up of a plurality of wire-like objects covered by a sheath, for example). The transmission member may be formed by applying a conductive coating on the functional sheet or etching on a copper foil, for example. Description herein is based on an assumption that the transmission member 40 is an electrical wire.

The transmission member 40 is provided to the functional sheet 30. Herein, a state where the transmission member 40 is provided to the functional sheet 30 indicates that a medium transmitting electrical power or light is formed to constitute an electrical or optical route on the functional sheet. Thus, the transmission member 40 provided to the functional sheet 30 includes a transmission member directly formed by applying a conductive coating to the functional sheet 30 or etching on a copper foil, or a transmission member in which the wire-like transmission member 40 manufactured separately from the functional sheet 30 is attached to form a constant route along one of or both main surfaces of the functional sheet 30. A specific configuration for supporting the transmission member 40 is not particularly limited.

For example, the transmission member 40 may be fixed to one main surface of the functional sheet 30. For example, the transmission member 40 may be welded (or fused) to one main surface of the functional sheet 30. A welding part thereby formed has a configuration that a part of the transmission member 40 and/or the functional sheet 30 is melted and adheres to the other side member. The transmission member 40 and the functional sheet 30 may be welded by ultrasonic welding or thermal welding. It is also applicable that a surface of the transmission member 40 and/or the functional sheet 30 is melted by a solvent to weld the transmission member 40 and the functional sheet 30. For example, the transmission member 40 may be fixed to the functional sheet 30 by an adhesive agent or a double-sided tape, for example. For example, the transmission member 40 may be sewn to the functional sheet 30 by a sewing thread. It is also applicable that an adhesive tape is attached to a portion from an outer side of one main surface of the functional sheet 30 to the transmission member 40 in a state where the transmission member 40 is disposed on one main surface of the functional sheet 30 to fix the transmission member 40 to one main surface of the functional sheet 30, for example. The transmission member 40 needs not be fixed to only one main surface of the functional sheet 30. The transmission member 40 may include both a part fixed to one main surface of the functional sheet 30 and a part fixed to the other main surface of the functional sheet 30. In this case, the transmission member 40 may be provided to pass from one main surface toward the other main surface in a middle portion or an end edge portion of the functional sheet 30.

For example, the transmission member 40 may be sandwiched between two sheets, thereby being fixed to the functional sheet 30. For example, in a case where the functional sheet 30 includes a plurality of layers, the transmission member 40 may be sandwiched between sheets constituting each layer. In a case where the other sheet overlaps with the functional sheet 30, the transmission member 40 may be sandwiched between the functional sheet 30 and the other sheet. In this case, the two sheets sandwiching the transmission member 40 may be fixed by welding, or may also be fixed by an adhesive agent or a double-sided tape.

Herein, the transmission member 40 is mainly provided on a surface of the functional sheet 30 on a side of the interior member 16.

The transmission manlier 40 is connected to the roof-side apparatus 50. The roof-side apparatus 50 transmits or receives an electrical signal or an optical signal via the transmission member 40. Alternatively, the roof-side apparatus 50 receives a power supply or distributes electrical power via the transmission member 40. The transmission member 40 and the roof-side apparatus 50 may be connected to each other via a connector. It is also applicable that the transmission member 40 is directly introduced in the roof-side apparatus 50 to be directly connected to an electrical element in the roof-side apparatus 50.

The roof-side apparatus 50 is an apparatus disposed on the roof part 14 to be a connection destination of the transmission member 40. Assumed as the roof-side apparatus 50 are, for example, an electrical control unit, a lamp (particularly, a map lamp and an interior lamp), a speaker, an interior camera, a monitor, a projection apparatus, an external communication antenna, and an interior-side antenna.

The roof-side apparatus 50 is an apparatus provided to the functional sheet 30. An arrangement position of the roof-side apparatus 50 on the functional sheet 30 is optionally set. The roof-side apparatus 50 is preferably fixed to a position appropriate for a role of the roof-side apparatus 50 on the functional sheet 30. For example, assuming that the roof-side apparatus 50 is a map lamp, the roof-side apparatus 50 may be fixed to a portion of the functional sheet 30 which is to be disposed in an obliquely upper front position of a front seat. For example, assuming that the roof-side apparatus 50 is an interior-side antenna, the roof-side apparatus 50 may be fixed to a portion of the functional sheet 30 which is to be disposed in upper position of a front seat or a rear seat.

It is preferable that the roof-side apparatus 50 may be finally fixed to the roof panel 13 or the interior member 16, for example. Thus, it is sufficient that the roof-side apparatus 50 is held by the functional sheet 30 at holding force so that the roof-side apparatus 50 is kept in a constant position in the functional sheet 30. For example, the roof-side apparatus 50 may be fixed to the functional sheet 30 by an adhesive agent, a gluing agent, or a double-sided tape. The roof-side apparatus 50 may be fixed to the functional sheet 30 with a screw or a pin, for example. The roof-side apparatus 50 may be fixed to the functional sheet 30 via the rigid member 60. In this case, the roof-side apparatus 50 may be fixed to the rigid member 60 by an adhesive agent, a gluing agent, or a double-sided tape, or may also be fixed with a screw or a pin, for example.

Figure 4:
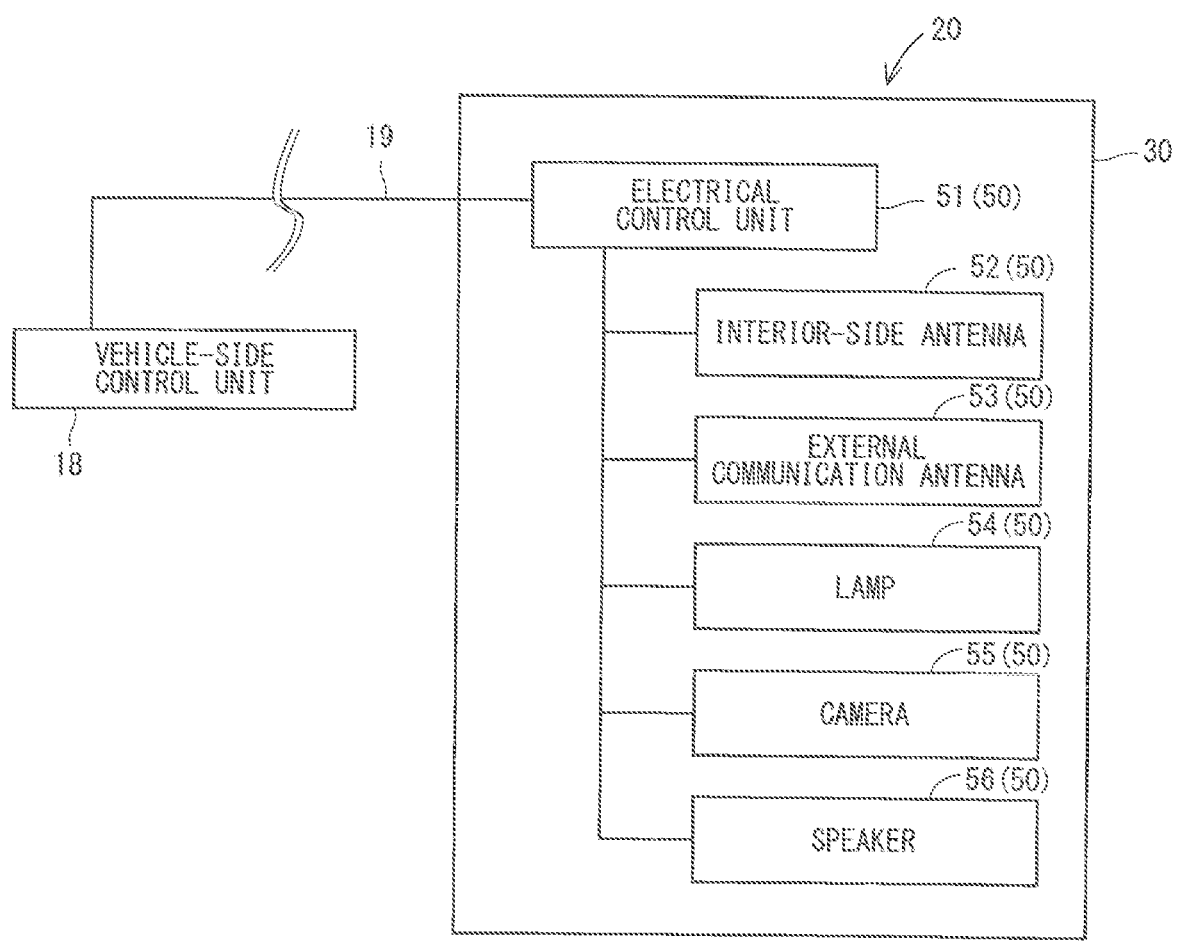
FIG. 4 is a functional block diagram according to the wiring module.

FIG. 4 is a functional block diagram according to the wiring module 20. FIG. 4 illustrates representative functional parts regardless of the number of functional parts. An example of the roof-side apparatus 50 is described with reference to FIG. 2 to FIG. 4.

The plurality of roof-side apparatuses 50 include an electrical control unit 51, an interior-side antenna 52, an external communication antenna unit 53, a lamp 54, a camera 55, and a speaker 56. A sign 50 is referenced when the roof-side apparatus is collectively referred, and signs 51, 52, 53, 54, 55, and 56 are referenced when the roof-side apparatus is separately distinguished in some cases hereinafter.

The electrical control unit 51 is a computer including a processor and a memory, for example, and executes control processing in accordance with a program which is previously stored. The electrical control unit 51 is assumed to be an area electronic control unit (ECU) controlling various apparatuses provided to the roof, for example. The electrical control unit 51 is connected to a vehicle-side apparatus 18 via a relay transmission member 19. The vehicle-side apparatus 18 is assumed to be the other electrical control unit (for example, a body ECU or a central ECU) provided to lower side of the roof. The vehicle-side apparatus 18 may be a power source device in place of or in addition to the electrical control unit. The relay transmission member 19 includes at least one of a communication line and/or a power source line. The relay transmission member 19 is disposed along a pillar, for example, and is routed from the roof toward the vehicle-side apparatus. The electrical control unit 51 is electrically connected to the vehicle-side apparatus 18 via the relay transmission member 19.

The electrical control unit 51 is communicably connected to the other apparatus provided to the roof such as the interior-side antenna 52, the external communication antenna unit 53, the lamp 54, the camera 55, and the speaker 56, for example. The transmission member 40 may include a communication line. The electrical control unit 51 can control the other roof-side apparatuses 52, 53, 54, 55, and 56 provided to the roof via the transmission member 40.

The transmission member 40 may include a power source line. The power source line included in the transmission member 40 may be directly connected to a power source line included in the relay transmission member 19, or may also be directly connected to a power source line included in the relay transmission member 19 via a power source branch box, for example. The power source branch box is a device into which a branch circuit made up of a bus bar and a circuit breaker component made up of a fuse or a semiconductor element, for example, are incorporated. The power source branch box may be incorporated into the electrical control unit 51, or may also be made up as a device different from the electrical control unit 51.

A position of each or the roof-side apparatuses 51, 52, 53, 54, 55, and 56 and a route of the transmission member 40 are optionally set in the functional sheet 30. In the example illustrated in FIG. 2 and FIG. 3, a part of the electrical control unit 51 and a part of the lamp 54 are provided in a central region in a width direction closer to a front side in the functional sheet 30. The external communication antenna unit 53 is provided in a central region in a width direction closer to a hack side in the functional sheet 30. A direction in which the vehicle travels is the front side, and an opposite direction thereof is the back side. Right and left sides are defined based on a state of being directed to the front side. The electrical control unit 51 may be biasedly provided to the right side or the left side of the functional sheet 30.

The external communication antenna unit 53 herein includes external communication antennas 53*a* and 53*b* for performing wireless communication with an apparatus located on the outer side of the vehicle. Herein, the external communication antenna unit 53 is formed into a flat shape. The external communication antennas 53*a* and 53*b* are incorporated into the external communication antenna unit 53. The external communication antennas 53*a* and 53*b* are antennas for performing communication with a wireless base station in a public communication line or a private communication line, antennas for vehicle-and-vehicle communication or road-and-vehicle communication, or antennas for receiving a GPS signal. Herein, the external communication antenna unit 53 includes the plurality of external communication antennas 53*a* and 53*b*, and is a complex antenna unit performing external communication in a plurality of systems. The external communication antenna unit 53 may include only one antenna or three or more antennas.

Herein, the external communication antenna unit 53 is formed into a thin box-like shape. The external communication antenna unit may be formed into a fin-like shape or a rod-like shape. In this case, the external communication antenna unit formed into the fin-like shape or the rod-like shape may be inserted into a hole formed in the roof panel to protrude to an outer side of the roof panel. Accordingly, the external communication antenna can be easily exposed outside, and a favorable external communication can be achieved through the external communication antennas 53*a* and 53*b*. The external communication antenna is preferably incorporated into a fin-like or rod-like external communication antenna unit to be located outside the roof panel. The external communication antenna unit may be attached to the body 12 instead of the functional sheet 30. In this case, a connector on an end portion of the transmission member 40 provided to the functional sheet 30 may be connector-connected to the external communication antenna unit on a side of the body 12.

The plurality of cameras 55 are provided separately in the region closer to the left side and the region closer to the right side of the functional sheet 30. In each of the right and left regions, the plurality of cameras 55 are provided separately in the front and back sides. For example, the plurality of speakers 56 are provided separately in the region closer to the left side and the region closer to the right side of the functional sheet 30. In each of the right and left regions, the plurality of speakers 56 are provided separately in the front and back sides. Furthermore, for example, the plurality of lamps 54 are provided separately in the region closer to the left side and the region closer to the right side of the functional sheet 30. In each of the right and left regions, the plurality of lamps 54 are provided separately in die front and back sides.

The camera 55 and the lamp 54 are provided around the speaker 56 on a forefront side in each of the rigid and left region, the lamp 54 is provided around the speaker 56 on a middle side in a front-back direction, and the camera 55 and the lamp 54 are provided around the speaker 56 on a rearmost side.

The plurality of interior-side antennas 52 are provided separately on the right and left sides of the functional sheet 30. Herein, the plurality of interior-side antennas 52 are provided in a region closer to a back side in relation to the electrical control unit 51 and closer to a front side in relation to the external communication antenna unit 53. The plurality of interior-side antennas 52 are provided separately on the right and left sides, and also provided separately on the front and back sides. More specifically, the plurality of interior-side antennas 52 are disposed in regions corresponding to seats, respectively, more specifically, in positions on upper sides of a driver seat, a passenger seat, and seating positions on right and left sides in a rear seat. The interior-side antenna 52 is used for a non-contact power supply (Wi-Fi (registered trademark) supply), for example.

The roof-side apparatuses 51, 52, 53, 54, 55, and 56 may be provided on any surface of the functional sheet 30. Described in the present embodiment is an example that the external communication antenna unit 53 is provided on the surface of the functional sheet 30 on a side of the roof panel 13. Described is an example that the electrical control unit 51, the interior-side antenna 52, the lamp 54, the camera 55, and the speaker 56 are provided on the surface of the functional sheet 30 on a side of the interior member 16.

The transmission member 40 passes through routes separated in two directions of right and left from the electrical control unit 51, and is connected to the roof-side apparatuses 52, 53, 54, 55, and 56. For example, focusing on the region closer to the left side in the functional sheet 30, some of the transmission members 40 extend in the left direction from the electrical control unit 51. Some of the transmission members 40 are bended on a near side of a left edge of the functional sheet 30 and extend to the front side or the back side along the left edge, and are connected to the roof-side apparatuses 52, 53, 54, 55, and 56 provided to the left side of the functional sheet 30. For example, focusing on the region closer to the right side in the functional sheet 30, the other some of the transmission members 40 extend in the right direction from the electrical control unit 51. The other some of the transmission members 40 are bended on a near side of a right edge of the functional sheet 30 and extend to the front side or the back side along the right edge, and are connected to the roof-side apparatuses 52, 53, 54, 55, and 56 provided to the right side of the functional sheet 30.

The relay transmission member 19 described above extends from the electrical control unit 51 to the front side. Herein, the relay transmission member 19 extending from the electrical control unit 51 is divided into the right and left sides, and extends to the front side along the right and left edges of the functional sheet 30. The relay transmission member 19 is led to a vehicle body side along an A pillar, for example. The relay transmission member 19 may be directly drawn from the electrical control unit 51, or connected to the electrical control unit 51 via a connector. It is also applicable that the relay transmission member 19 is not attached to the functional sheet 30, but is separated from the functional sheet 30 and led toward the A pillar, for example.

When the roof-side apparatus is located on different surface of the functional sheet 30, it is sufficient that the transmission member 40 passes through the functional sheet 30. For example, it is also applicable that the transmission member 40 connected to the external communication antenna unit 53 passes across the surface of the functional sheet 30 on the side of the interior member 16 from the electrical control unit 51 to be routed near the external communication antenna unit 53, and passes through the functional sheet 30 near the external communication antenna unit 53 to be drawn to a side of the roof panel 13.

The rigid member 60 is a member provided to the functional sheet 30. The rigid member 60 is a member supplying hardness of deformation to the functional sheet 30. The rigid member 60 preferably has higher rigidity than the functional sheet 30. A degree of rigidity herein may be evaluated by bending rigidity on a reference surface, which is a surface perpendicular to a longitudinal direction of the rigid member 60, of the rigid member 60 and bending rigidity on the reference surface in a partial region in the functional sheet 30 where the rigid member 60 is provided. For example, the functional sheet 30 may be a stacked body of an aluminum foil and a non-woven cloth, and the rigid member 60 may be a plate-like material or a rod-like material made of filled resin (for example, polypropylene (PP) or polyamide (PA)). The rigid member 60 may be a member achieving weight saving while having strength such as a honey comb structure member. The rigid member 60 may be formed by metal such as iron or aluminum, for example.

The rigid member 60 is fixed to the functional sheet 30 by an adhesive agent, a gluing agent, a double-sided tape, or welding (ultrasonic welding or thermal welding), for example. The rigid member 60 may be fixed to the functional sheet 30 with a screw or a pin, for example. Herein, the rigid member 60 is formed into an elongated rectangular shape. A length dimension of the rigid member 60 is set to be the same as a width dimension of the functional sheet 30. The length dimension of the rigid member 60 may be smaller than the width dimension of the functional sheet 30 as long as an edge of the functional sheet 30 does not hang immediately downward (for example, smaller within a range of 20 cm or less). The rigid member 60 is disposed on the surface of the functional sheet 30 on the side of the roof panel 13. Facing surfaces thereof are bonded by an adhesive agent, for example.

In the present embodiment, the plurality of (herein, four) rigid members 60 are fixed to the functional sheet 30. The length direction of each rigid member 60 follows the width direction of the functional sheet 30. Thus, a part of the functional sheet 30 provided with the rigid member 60 is kept in a state of hardly hanging downward in the width direction.

The plurality of rigid members 60 are provided at intervals in a front-back direction of the functional sheet 30. Thus, the functional sheet 30 may be bended between the plurality of rigid members 60. When the present wiring module 20 is stored or transported, a space for storing or transporting the wiring module 20 can be reduced by folding the functional sheet 30 between the plurality of rigid members 60.

An arrangement region of the rigid member 60 on the functional sheet 30 is optionally set. The rigid member 60 may be provided to a partial region in the functional sheet 30.

When the speaker 56 in the roof-side apparatus 50 described above is a support target roof-side apparatus, the rigid member 60 may be provided in a region where the speaker 56 is provided to the functional sheet 30. In FIG. 2 and FIG. 3, the plurality of speakers 56 are separately provided in three regions in the front-back direction of the functional sheet 30. The rigid member 60 is provided in three regions where the speaker 56 is provided. In each of these regions, the rigid member 60 is fixed to the surface of the functional sheet 30 on the side of the roof panel 13, and the speaker 56 is fixed to the surface thereof on the side of the interior member 16.

When the external communication antenna unit 53 in the roof-side apparatus 50 is a support target roof-side apparatus, the rigid member 60 may be provided in a region where the external communication antenna unit 53 is provided to the functional sheet 30. In FIG. 2 and FIG. 3, the external communication antenna unit 53 is provided in a region closer to the back side in the functional sheet 30. The rigid member 60 is provided in the region where the external communication antenna unit 53 is provided. In this region, the rigid member 60 is fixed to the surface of the functional sheet 30 on the side of the roof panel 13, and the external communication antenna unit 53 is fixed to the further upper side thereof. The external communication antenna unit 53 may be fixed to the functional sheet 30 in a portion on an outer side of the rigid member 60. The external communication antenna unit 53 may be fixed to the rigid member 60.

The support target roof-side apparatus may be all or some of the plurality of roof-side apparatuses 50. The support target roof-side apparatus may be a heavy apparatus in the plurality of roof-side apparatuses 50. For example, the speaker 56 and the external communication antenna unit 53 are examples of the heavy apparatuses. The rigid member 60 is provided in a region in the functional sheet 30 where the speaker 56 and the external communication antenna unit 53 are provided, thus can firmly support the speaker 56 and the external communication antenna unit 53 easily. The support target roof-side apparatus may be an apparatus exposed to the vehicle interior such as the lamp 54, the camera 55, and a switch, for example. There is a possibility that these apparatuses are pressed from a side of the vehicle interior. Thus, when the rigid member 60 is disposed on the outer side of these apparatuses, the pressed force can be received by the rigid member 60.

Each roof-side apparatus 50 may be fixed to any position while the wiring module 20 is incorporated into the roof part 14. The roof-side apparatus 50 may be fixed to the roof panel 13 or a frame supporting the roof panel 13. The roof-side apparatus 50 may be fixed to the interior member 16. When the rigid member 60 is fixed to the roof panel 13 or the frame supporting the roof panel 13, the roof-side apparatus 50 may only be fixed to the rigid member 60.

The rigid member 60 preferably includes a roof fixing part 70 fixed to the roof part 14 as a roof part of a vehicle. Herein, the roof fixing part 70 protruding toward an upper side of the rigid member 60 is formed. The roof fixing part 70 is a part fixed to the roof panel 13 or the frame supporting the roof panel 13 in the roof part 14. The roof fixing part 70 is assumed to be a clip-like shaped part fixed by insertion so as not to come out from the roof panel 13 or the frame or a screw, for example. It is not necessary to fix the rigid member 60 to the roof part 14.

Figure 5:
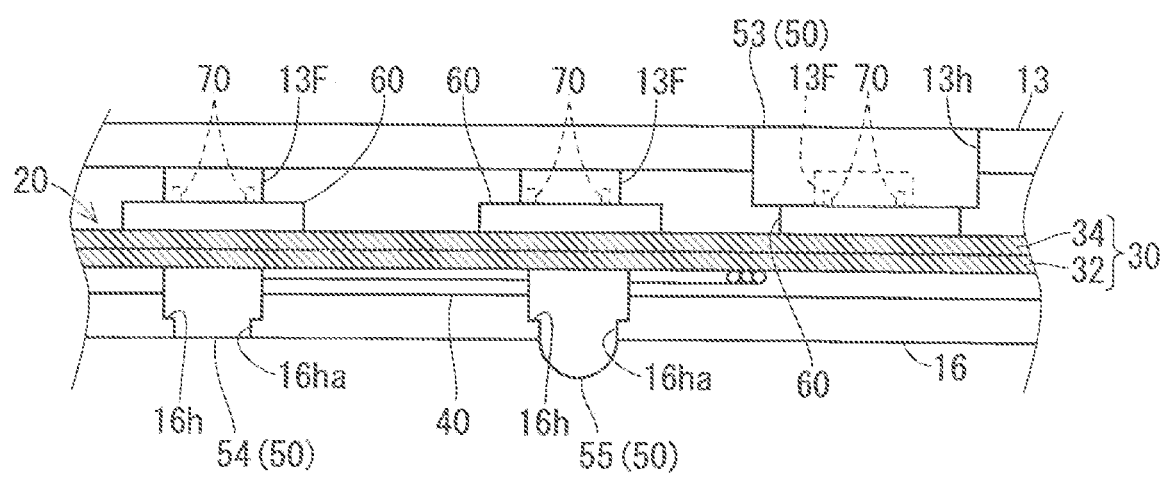
FIG. 5 is a schematic cross-sectional view illustrating the wiring module.

FIG. 5 is a schematic cross-sectional view illustrating the wiring module 20. FIG. 5 illustrates the roof panel 13, a frame 13F supporting the roof panel 13, and the interior member 16. The frame 13F is an elongated rigid member disposed on an inner side of the roof panel 13 or a member referred to as a reinforcement bar or a stay, for example. The frame 13F is disposed along a vehicle width direction, for example.

As illustrated in FIG. 5, the rigid member 60 is fixed to the frame 13F via the roof fixing part 70. The functional sheet 30 is located on the side of the interior member 16 of the rigid member 60.

The electrical control unit 51, the interior-side antenna 52, the lamp 54, the camera 55, and the speaker 56, for example, are held on the surface of the functional sheet 30 on the side of the interior member 16. These electrical control unit 51, the interior-side antenna 52, the lamp 54, the camera 55, and the speaker 56 may be only disposed on the interior member 16, or may also be fixed to the interior member 16 by a fitting structure. The lamp 54 and the camera 55 may be exposed to the vehicle interior. In this case, the concave part 16h into which the lamp 54 and the camera 55 can be fitted may be formed in the interior member 16, and an opening 16ha exposing the lamp 54 and the camera 55 to the vehicle interior may be formed in the concave part 16h.

In FIG. 5, the functional sheet 30 is provided to an upper side of the lamp 54 and the camera 55, and the rigid member 60 is provided to a further upper side thereof. Thus, even when the lamp 54 and the camera 55 are pressed, force thereof is received by the rigid member 60, and it is suppressed that the lamp 54 and the camera 55 are moved from the interior member 16 toward the side of the roof panel 13.

The external communication antenna unit 53 is provided on the surface of the functional sheet 30 on the side of the roof panel 13. The rigid member 60 located between the external communication antenna unit 53 and the functional sheet 30 is preferably fixed to the frame 13F on an outer lateral side of the external communication antenna unit 53 via the roof fixing part 70. The external communication antenna unit 53 is exposed to an outer side via the antenna hole 13h formed in the roof panel 13.

The functional sheet 30 is disposed between the interior member 16 and the roof panel 13. The functional sheet 30 may be fixed to the interior member 16, for example, or may also be simply located on the interior member 16. For example, the functional sheet 30 may be fixed to the interior member 16 by a double-sided tape, an adhesive agent, or welding.

As described above, the functional sheet 30 includes a layer having at least one selected from the group consisting of a heat insulation function, an acoustic insulation function, and a radio wave shielding function. In FIG. 5, the functional sheet 30 includes a non-woven layer 32 and a radio wave shielding layer 34. Herein, the functional sheet 30 has a multilayer structure in which the non-woven layer 32 and the radio wave shielding layer 34 overlap with each other from a lower side to an upper side. An order of overlapping each layer is optionally set. For example, the radio wave shielding layer 34 may be provided to a lower side of the non-woven layer 32. In a case where the functional sheet includes a plurality of functional layers, it is not necessary to arrange the plurality of functional layers to be overlapped in a thickness direction of the functional sheet. The plurality of functional layers may be provided in different regions in a region where the functional sheet extends. For example, the plurality of functional layers may be provided side by side in a region where the functional sheet extends. The other functional layer may be partially provided on one functional layer.

The non-woven layer 32 is an example of a layer having a heat insulation property suppressing a heat transmission between one main surface and the other main surface of the functional sheet 30. The heat insulating layer may be a layer reflecting heat radiation energy. The heat insulating layer may be a layer having lower heat conductivity than the other layer. For example, a sheet including minute spaces such as a non-woven sheet or a foam sheet, for example, may be used for the heat insulating layer. A heat insulating coating or a heat shielding coating may be used as the heat insulating layer.

The non-woven layer 32 can also be grasped as an example of a layer having an acoustic insulation property suppressing an acoustic transmission between one main surface and the other main surface of the functional sheet 30. The layer having the acoustic insulating property may reflect sound or absorb energy of sound as heat energy. For example, a sheet including minute spaces such as a nonwoven sheet or a foam sheet, for example, may be used as an acoustic insulating layer. A sound absorbing coating may be used as the acoustic insulation layer.

The heat insulating layer and the acoustic insulating layer may be provided as physically different layers.

The radio wave shielding layer 34 is a layer suppressing a radio wave transmission between one main surface and the other main surface of the functional sheet 30. The radio wave shielding layer 34 may have a radio wave shielding property on all of frequencies. The radio wave shielding layer 34 may have a selective radio wave shielding property on some frequency band. In this case, it is sufficient that reflection and/or absorption of radio wave of some frequency band s performed in the radio wave shielding layer. The radio wave shielding layer 34 may be a layer formed of a metal foil such as aluminum or iron. A known frequency selective surface (FSS) may be used as the radio wave shielding layer 34 having the selective radio wave shielding property. FIG. 5 is a diagram illustrating an example of a frequency selective film. The frequency selective film has a configuration that a unit cell (element) is formed by a metal foil on a base film formed of resin, for example. Such a frequency selective surface has characteristics of selectively shielding radio wave of one or a plurality of frequency bands in accordance with frequency characteristics of the unit cell (element), and passing radio wave of the other frequency band. The radio wave shielding layer having the selective radio wave shielding property may also be formed by directly printing a conductive paste on a heat insulating layer or an acoustic insulation layer, for example.

The layers may be simply overlapped with each other. The layers may be fixed to each other by a double-sided tape, an adhesive agent, or welding, for example.

When the wiring module 20 includes the radio wave shielding layer 34, the external communication antenna unit 53 is preferably provided to an outer side of the vehicle on the radio wave shielding layer 34. Accordingly, the radio wave radiated from the external communication antennas 53*a* and 53*b* is shielded by the radio wave shielding layer 34, and is hardly transmitted to the inner side of the vehicle. The radio wave radiated from the external communication antennas 53*a* and 53*b* is not shielded by the radio wave shielding layer 34, but is transmitted to the outer side. Thus, the wireless communication with an external apparatus (a base station, for example) via the external communication antennas 53*a* and 53*b* is favorably performed. The radio wave is not transmitted to the inner side of the vehicle, thus radiation efficiency of the radio wave to the outer side of the vehicle increases. Also from this point, the wireless communication with an external apparatus (a base station, for example) via the external communication antennas 53*a* and 53*b* is favorably performed.

Based on a premise that the wiring module 20 includes the radio wave shielding layer 34, the interior-side antenna 52 is preferably provided to the vehicle interior side of the radio wave shielding layer 34. Accordingly, the radio wave radiated from the interior-side antenna 52 and an interior apparatus in the vehicle is shielded by the radio wave shielding layer 34, and is hardly transmitted to the outer side of the vehicle. Accordingly, the radio wave used by the interior-side antenna 52 for wireless communication is shielded by the radio wave shielding layer 34, and is hardly transmitted to the vehicle exterior side. In the meanwhile, the radio wave radiated from the interior-side antenna 52 is transmitted to the vehicle interior side on an opposite side of the interior-side antenna 52 from the radio wave shielding layer 34. Thus, the wireless communication with an interior apparatus can be favorably performed through the interior-side antenna 52. When the interior-side antenna 52 performs a non-contact power supply to an interior apparatus, the radio wave (electrical power) is not leaked to the outer side of the vehicle, thus the non-contact power supply is efficiently performed.

The interior-side antenna 52 is relatively thin and light in weight, thus it is sufficient that the interior-side antenna 52 is fixed only to the functional sheet 30, and needs not be fixed to the interior member 16.

Figure 6:
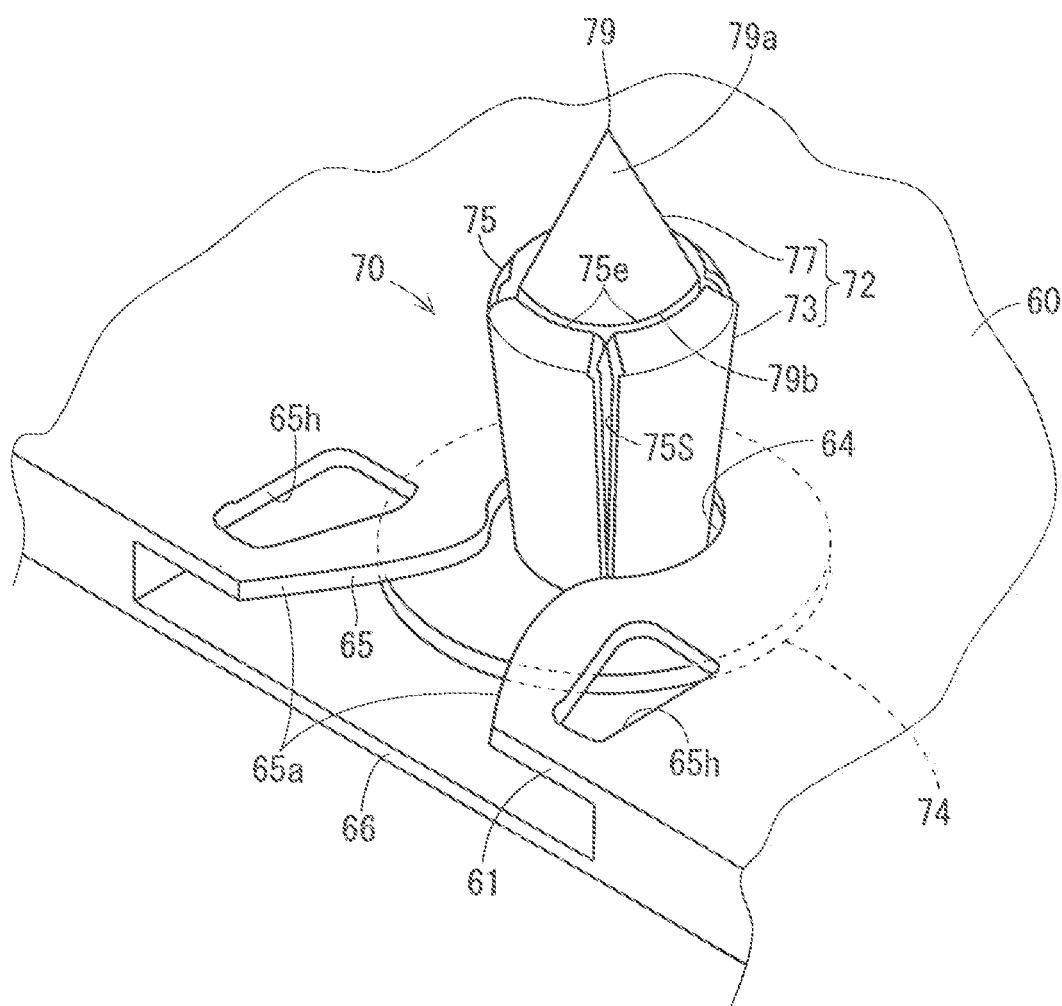
FIG. 6 is a perspective view illustrating a roof fixing part provided on a rigid member.
Figure 7:
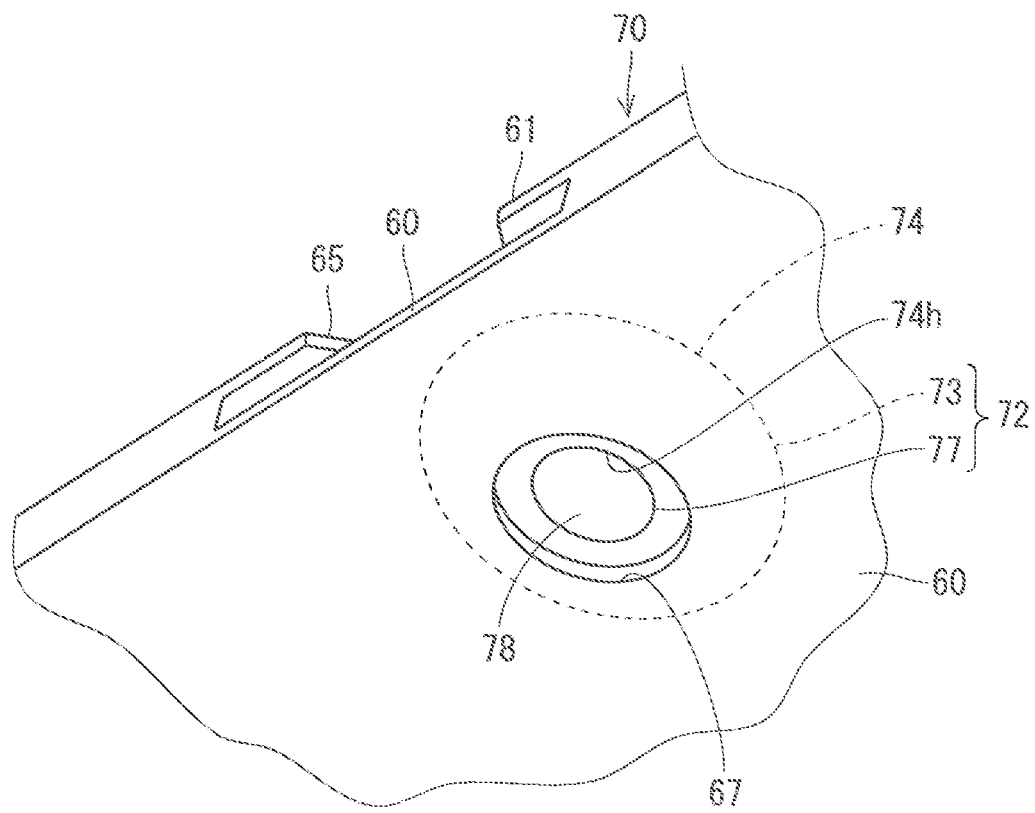
FIG. 7 is a perspective view illustrating the roof fixing part provided on the rigid member.
Figure 8:
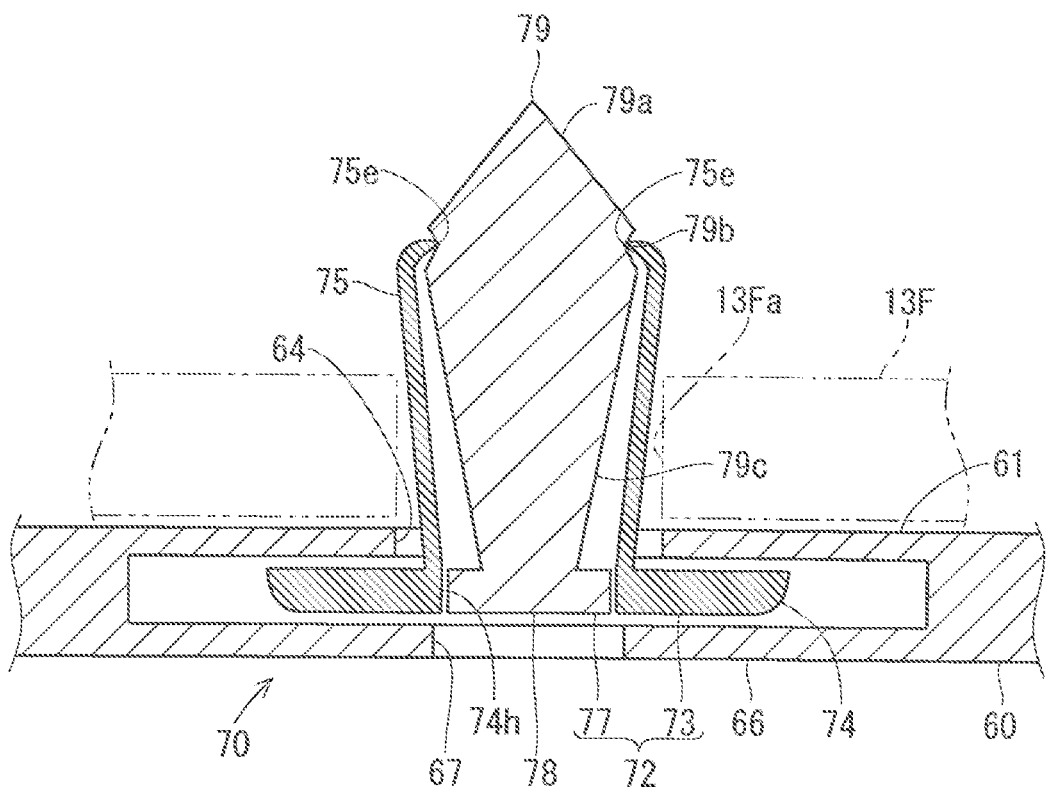
FIG. 8 is a cross-sectional view illustrating the roof fixing part.

A specific example of the roof fixing part 70 is described. FIG. 6 and FIG. 7 are perspective views illustrating the roof fixing part 70 provided to the rigid member 60. FIG. 8 is a cross-sectional view illustrating the roof fixing part 70.

The roof fixing part 70 has a configuration that a fitting fixing part 72 is held by the holding hole 64 formed in the rigid member 60.

The holding hole 64 is formed in a plate-like part 61 of the rigid member 60. That is to say, the plate-like part 61 extending along a direction of a main surface of the rigid member 60 is provided. The plate-like part 61 may be a part integrally formed on a part of the rigid member 60 fixed to the functional sheet 30, or may also be a part attached to a part of the rigid member 60 fixed to the functional sheet 30 by welding, bonding, a screw, or a fitting structure, for example.

The holding hole 64 is formed in a position on an inner side away from an edge of the plate-like part 61. The holding hole 64 is formed into a circular hole-like shape. An introduction part 65 having a slit-like shape is formed to extend from the holding hole 64 toward the edge of the plate-like part 61. The introduction part 65 includes a pair of guide edges 65*a* gradually narrowing from the edge of the plate-like part 61 toward the holding hole 54. A relief opening 65h is formed in a portion away from the pair of guide edges 65a. Thus, the pair of guide edges 65a can be elastically deformed to narrow the relief opening 65h and widening a portion between the pair of guide edges 65a.

An auxiliary plate-like part 66 is formed away from the plate-like part 61. An auxiliary hole 67 is formed in a part of the auxiliary plate-like part facing the holding hole 64. A space where a head part 74 described hereinafter can be disposed is provided to a peripheral part of the holding hole 64 described above between the plate-like part 61 and the auxiliary plate-like part 66. The auxiliary plate-like part 66 may be omitted.

The fitting fixing part 72 includes a fitting body part 73 and a fitting state holding pin 77.

The fitting body part 73 is a member formed of resin, for example, and includes the head part 74 and an insertion part 75. The head part 74 is formed into a circular plate-like shape. The insertion part 75 is formed into a shape protruding from one main surface of the head part 74. More specifically, the insertion part 75 is formed into a cylindrical shape. A plurality of slits 75S are formed in the insertion part 75 along an axis direction of the insertion part 75. A tip end portion 75e of the insertion part 75 is formed into a shape directed inward. The insertion part 75 can be deformed to widen a tip end side thereof.

An opening 74h is formed in the head part 74. The fitting state holding pin 77 is fitted in the insertion part 75 from the opening 74h. The fitting state holding pin 77 includes a pin head part 78 and a columnar part 79. The pin head part 78 is formed into a circular plate-like shape so that it can be disposed in the opening 74h. The columnar part 79 is formed into an elongated shape protruding from the pin head part 78. The tip end portion of the pin head part 78 is formed in a first guide surface 79a gradually thickened from a tip end side toward a base end side. An intermediate portion of the pin head part 78 in a longitudinal direction is formed in a groove part 79b concaved inward along a circumferential direction thereof. The tip end portion 75e of the insertion part 75 described above is fitted in this groove part 79b. The base end portion of the pin head part 78 is formed in a second guide surface 79c gradually thinned from the tip end side toward the base end side.

The auxiliary hole 67 in the auxiliary plate-like part 66 is formed to have a larger outer diameter than an outer diameter of the pin head part 78.

In an initial state, the pin head part 78 of the fitting state holding pin 77 protrudes to an outer side of the head part 74 of the fitting body part 73. The base end portion of the insertion part 75 in this fitting fixing part 72 is held in the holding hole 64 described above, and the head part 74 is disposed between the plate-like part 61 and the auxiliary plate-like part 66, thus the fitting fixing part 72 is supported on the rigid member 60. In this state, the insertion part 75 is held by a narrowed portion between the holding hole 64 and the introduction part 65 so that it does not come out of the holding hole 64.

When the rigid member 60 is fixed to the frame 13F, for example, the insertion part 75 is fitted in a fixing hole 13Fa formed in the frame 13F. Subsequently, the fitting state holding pin 77 is pressed toward the fitting body part 73. Then, the tip end portion 75e of the insertion part 75 is pressed outward by the first guide surface 79a of the pin head part 78. Accordingly, an outward portion of the tip end portion of the insertion part 75 is locked to or has contact with the fixing hole 13Fa formed in the frame 13F so as not to come out of the fixing hole 13Fa. The fitting state holding pin 77 is further pressed therein, and the tip end portion 75e of the insertion part 75 is fitted in the groove part 79b of the pin head part 78, thus the fitting fixing part 72 is kept in a slate of being fitted in the fixing hole 13Fa formed in tire frame 13F. In this state, an outward surface of the pin head part 78 may be located on an extension line of an outward surface of the head part 74. Accordingly, the pin head part 78 is hardly pressed therein unnecessarily.

When the pin head part 78 is further pressed therein front the state described above, a fitting state of the tip end portion 75e of the insertion part 75 and the groove part 79b of the pin head part 78 is released, and the tip end portion 75e of the insertion part 75 can be moved inward from the second guide surface 79c of the pin head part 78. Accordingly, a locking state or a contact suite between the outward portion of the tip end portion of the insertion part 75 and the fixing hole 13Fa is released, and the fitting fixing part 72 can be detached from the fixing hole 13Fa formed in the frame 13F. According to such a configuration, the rigid member 60 can be easily attached to and detached from the frame 13F.

According to the wiring module 20 having such a configuration, the roof-side apparatus 50 and the transmission member 40 are provided to the functional sheet 30. Thus, in the wiring module 20, the functional sheet 30, the roof-side apparatus 50, and the transmission member 40 can be easily incorporated into the roof part 14 collectively. At this time, the functional sheet 30 is considered to hang downward by a self-weight. The functional sheet 30 is considered to bang downward by a weight of the roof-side apparatus 50 and a weight of the transmission member 40 provided to the functional sheet 30. There is a possibility that the wiring module 20 extends widely to the lower side of the roof part 14, thus when a part of the wiring module 20 hangs downward, it is difficult to incorporate the wring module 20 into the roof part 14.

The present wiring module 20 is provided with the rigid member 60 on the functional sheet 30. Thus, a part of the functional sheet 30 provided with the rigid member 60 is kept in a state of hardly hanging downward. Accordingly, the wiring module 20 is easily incorporated into the roof part 14.

For example, FIG. 9 is a schematic explanation view illustrating a position of the wiring module 20 in the vehicle 10. FIG. 9 illustrates a positional relationship in a plane vertical to a right-left direction. As illustrated in FIG. 9, the wiring module 20 is provided between the interior member 16 and the roof panel 13. Vehicle-side apparatuses 18A and 18B are provided to a vehicle body side. The vehicle-side apparatuses 18A and 18B are apparatuses provided to a lower side than the interior member 16 in the body 12, for example. As described above, each of the vehicle-side apparatuses 18A and 18B is a body ECU or a central ECU, or may also be a power source device. For example, the vehicle-side apparatus 18A is an ECU, and the vehicle-side apparatus 18B is a power source device. The relay transmission member 19 drawn from the vehicle-side apparatuses 18A and 18B is drawn between the roof panel 13 and the interior member 16 through the A pillar 11P, for example, and connected to the electrical control unit 51. As described above, the relay transmission member 19 may be directly introduced into the electrical control unit 51, or connected to the electrical control unit 51 via a connector.

The wiring module 20 is assembled to the roof panel 13 as fellows, for example. That is to say, an operator raises the wiring module 20 from a lower side of the roof panel 13 and attaches it to the roof panel 13, for example. At this time, the operator raises a part of the wiring module 20 provided with the rigid member 60 from a lower side (refer to an arrow P).

Then, the wiring module 20 supported in the state of hardly hanging downward is assembled to the roof panel 13 even when there is relatively a small number of supporting positions. Thus, the wiring module 20 is easily assembled to the roof panel 13.

When the rigid member 60 is provided in a region of the functional sheet 30 provided with the support target roof-side apparatus (the external communication antenna unit 53, the lamp 54, and the camera 55), for example, the wiring module 20 can be firmly supported by the rigid member 60 even in a case where those support target roof-side apparatuses are pressed from a vehicle interior side.

When the rigid member 60 is fixed to the roof part 14 via the roof fixing part 70, the rigid member 60 is firmly fixed to the roof part 14.

The holding hole 64 in the rigid member 60 supports the fitting fixing part 72 while allowing the movement of the fitting fixing part 72 in a direction in which the functional sheet 30 extends. Thus, when there is a manufacturing error or an assembly error, for example, in fixing the rigid member 60 to the roof part 14 in the functional sheet 30, the position of the fitting fixing part 72 is adjusted in accordance with a position of the fixing hole 13Fa in the frame 13F. Thus, the fitting fixing part 72 is easily fitted in and fixed to the roof panel 13.

Figure 10:
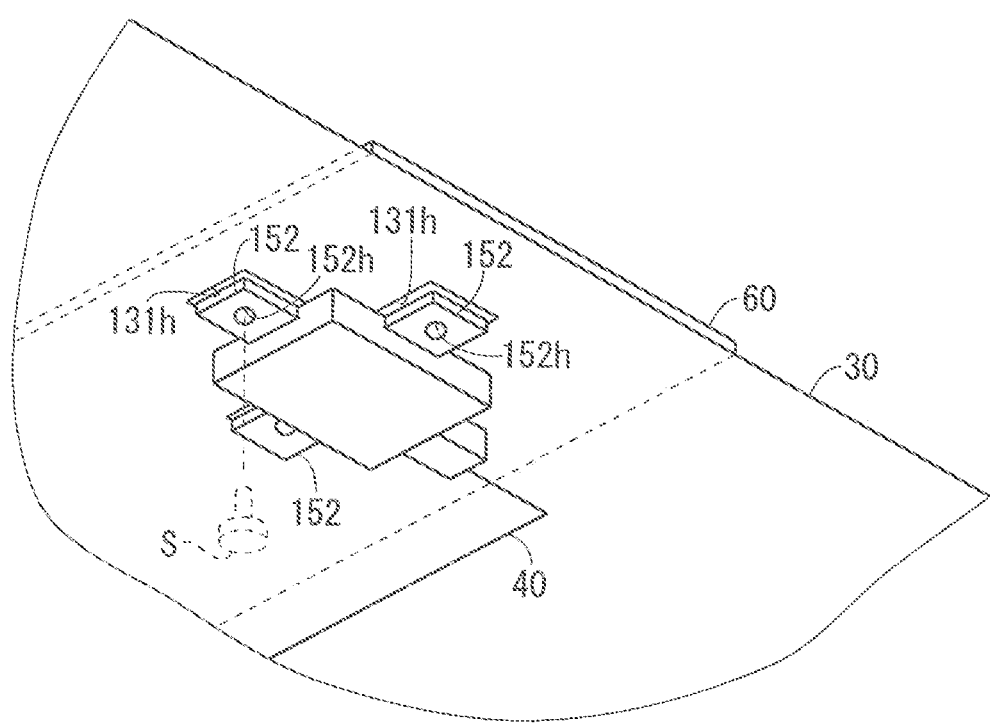
FIG. 10 is a perspective view illustrating a modification example according to an embodiment 1.

FIG. 10 is a perspective view illustrating a modification example according to the embodiment 1. As illustrated in FIG. 10, when the functional sheet 30 is located between the roof-side apparatus 50 and the rigid member 60 in the present embodiment, the roof-side apparatus 50 may be directly fixed to the rigid member 60. In the present example, a fixing piece 152 is provided to protrude from the roof-side apparatus 50, and an opening 131h is formed in a region corresponding to the fixing piece 152 in the functional sheet 30. Also applicable is a configuration that a fixing member S such as a screw is inserted into an insertion hole 152h formed in the fixing piece 152, and is fixed to a fixing, hole formed in the rigid member 60 by screwing through the opening 131h described above.

Embodiment 2

Figure 11:
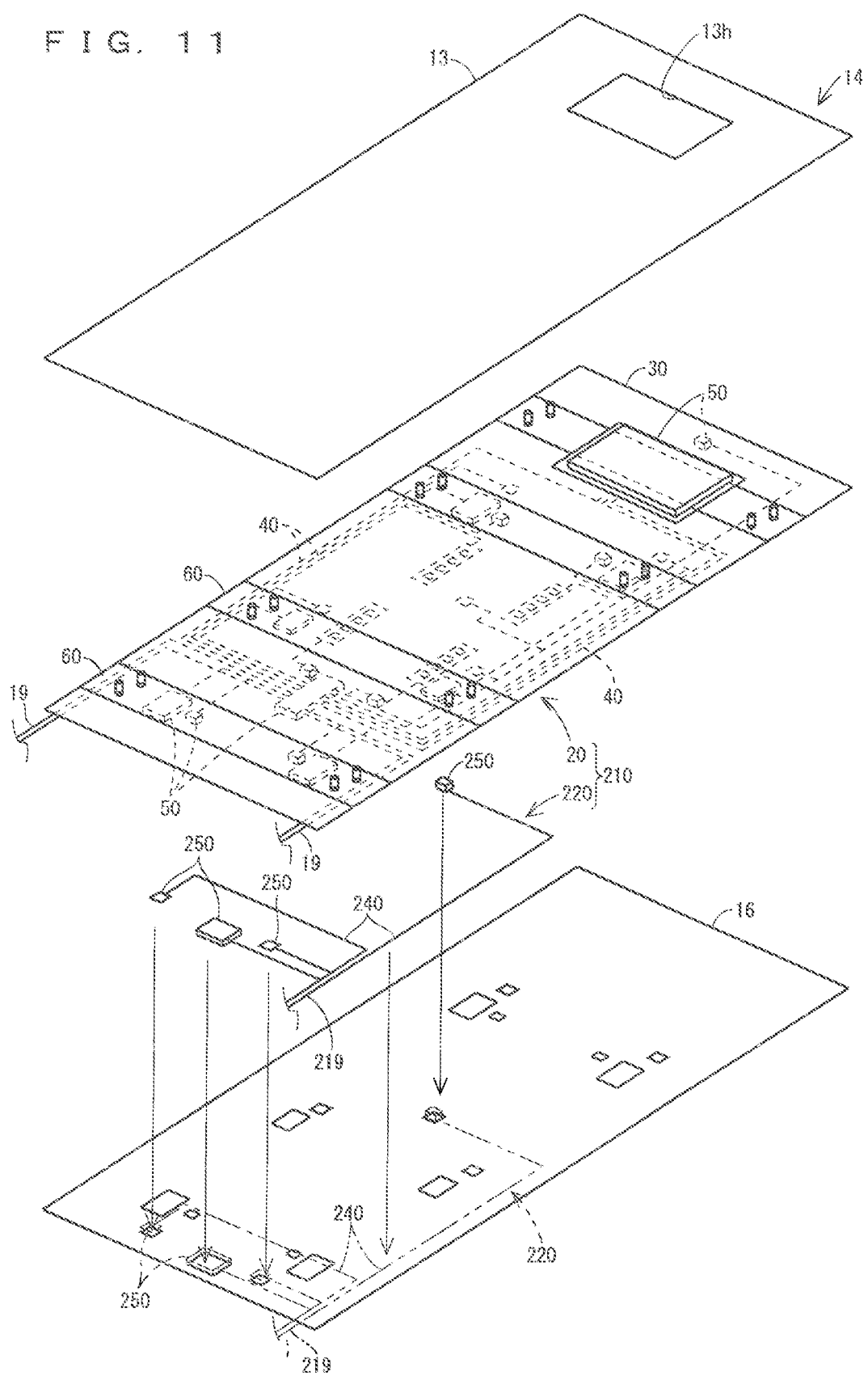
FIG. 11 is an exploded perspective view illustrating a wiring module set.

A wiring module set according to a second embodiment is described. FIG. 11 is an exploded perspective view illustrating a wiring module set 210. FIG. 2 illustrates the roof part 14.

The wiring module set 210 includes the wiring module 20 and an interior member side wiring module 220.

The wiring module 20 may have a configuration similar to that described in the above embodiment 1.

The interior member side wiring module 220 is a wiring module provided to the interior member 16. The interior member side wiring module 220 includes an interior member side transmission member 240. The interior member side transmission member 240 may be the same as the transmission member 40 described above. Description herein is based on an assumption that the interior member side transmission member 240 is an electrical wire.

The interior member side transmission member 240 is connected to some roof-side apparatus 250 in apparatuses incorporated into the roof part 14. The interior member side transmission member 240 may be directly guided into the roof-side apparatus 250 and directly connected to electrical components therein, or may also be connected via a connector. This roof-side apparatus 250 is not fixed to the functional sheet 30. The roof-side apparatus 250 may be fixed to the interior member 16, the roof panel 13, and the frame 13F, for example. FIG. 11 illustrates an example of fixing the roof-side apparatus 250 to the interior member 16.

It is applicable that the interior member side wiring module 220 is incorporated into the roof part 14 together with the roof-side apparatus 250, or may also be incorporated into the roof part 14 separately from the roof-side apparatus 250 to be connector-connected to the roof-side apparatus 250 in the roof part 14. The interior member side transmission member 240 may be fixed to the interior member 16 by an adhesive tape or a gluing agent, for example.

The interior member side transmission member 240 may be a wiring route independent of the wiring module 20 described above. For example, the interior member side transmission member 240 is preferably connected to a vehicle-side apparatus via a relay transmission member 219 different from the relay transmission member 19 described above.

According to the present embodiment 2, the interior member side transmission member 240 in the interior member side wiring module 220 and the transmission member 40 in the wiring module 20 can be separately incorporated into the roof part 14 in the vehicle. Accordingly, it is possible to easily deal with a difference of grade or presence or absence of an optional component, for example.

For example, the plurality of roof-side apparatuses incorporated into the roof part 14 are classified into roof-side apparatuses incorporated regardless of a grade of a vehicle or presence or absence of an option (a map lamp, for example, which may also be referred to as a common roof-side apparatus) and a roof-side apparatus which is or is not incorporated in accordance with a grade of a vehicle and presence or absence of an option (a camera or an interior-side antenna, for example, which may also be referred to as an optional roof-side apparatus). A wiring member connected to the former roof-side apparatus is preferably incorporated into the interior member side wiring module 220 as the interior member side transmission member 240. A wiring member connected to the latter roof-side apparatus is preferably incorporated into the wiring module 20 as the transmission member 40. Accordingly, a base specification in a vehicle can be manufactured by the interior member side wiring module 220, and various types of usage in which the roof-side apparatus is added thereto can be collectively incorporated together with the functional sheet 30 to easily deal with a difference of grade or presence or absence of an optional component.

Each configuration described in the above embodiments and modification examples thereof can be appropriately combined as long as they are not contradictory.

EXPLANATION OF REFERENCE SIGNS 10 vehicle
11P A pillar
12 body
13 roof panel
13F frame
13Fa fixing hole
13h antenna hole
14 roof part
16 interior member
16h concave part
16ha opening
18, 18A, 18B vehicle-side apparatus
19 relay transmission member
20 wiring module 30 functional sheet
32 non-woven layer
34 radio wave shielding layer
40 transmission member
50, 250 roof-side apparatus
51 electronical control unit (roof-side apparatus)
52 interior-side antenna (roof-side apparatus)
53 external communication antenna unit (roof-side apparatus)
53a, 53b external communication antenna
54 lamp (roof-side apparatus)
55 camera (roof-side apparatus)
56 speaker (roof-side apparatus)
60 rigid member
61 plate-like part
64 holding hole
65 insertion part
65a guide edge
65h relief opening
66 auxiliary plate-like part
67 auxiliary hole
70 roof fixing part
72 fitting fixing part
73 fitting body part
74 head part
74h opening
75 insertion part
75S slit
75e tip end portion
77 fitting state holding pin
78 pin head part
79 columnar part
79a first guide surface
79b concave part
79c second guide surface
131h opening
153 fixing piece
152h insertion hole
210 wiring module set
219 relay transmission member
220 interior member side wiring module
24 interior member side transmission member

The invention claimed is:

1. A wiring module, comprising:
a functional sheet disposed between a roof panel forming a roof part of a vehicle and an interior member forming a ceiling shape of a vehicle interior to planarly extend over the roof panel and the interior member;
a transmission member provided to the functional sheet;
a roof-side apparatus provided to the functional sheet; and
a rigid member provided to the functional sheet, wherein
the functional sheet includes a layer having at least one selected from the group consisting of a heat insulation function, an acoustic insulation function, and a radio wave shielding function,
at least one end of the transmission member is provided along a wiring route connected to the roof-side apparatus in the functional sheet,
the rigid member includes a roof fixing part fixed to a roof part of the vehicle, and
the roof fixing part includes a holding hole supporting a fitting fixing part fitted in and fixed to the roof part of the vehicle while allowing movement of the fitting fixing part in a direction in which the functional sheet extends.

2. The wiring module according to claim 1, wherein
the roof-side apparatus includes a support target roof-side apparatus, and
the rigid member is provided in a region of the functional sheet, the region provided with the support target roof-side apparatus.

3. A wiring module set, comprising:
an interior member side wiring module including an interior member side transmission member provided to an interior member forming a ceiling shape of a vehicle interior; and
the wiring module according to claim 1.

4. A wiring module set, comprising:
a wiring module including: a functional sheet disposed between a roof panel forming a roof part of a vehicle and an interior member forming a ceiling shape of a vehicle interior to planarly extend over the roof panel and the interior member; a transmission member provided to the functional sheet; and a roof-side apparatus provided to the functional sheet, wherein the functional sheet includes a layer having at least one selected from the group consisting of a heat insulation function, an acoustic insulation function, and a radio wave shielding function, and at least one end of the transmission member is provided along a wiring route connected to the roof-side apparatus in the functional sheet; and
the interior member side wiring module including an interior member side transmission member provided to the interior member, wherein
the interior member side transmission member is a member connected to a roof-side apparatus incorporated regardless of a grade of a vehicle and presence or absence of an option, and
the transmission member is a member connected to a roof-side apparatus which is or is not incorporated in accordance with a grade of a vehicle and presence or absence of an option.

5. The wiring module set according to claim 4, wherein
the interior member side transmission member is a member connected to a roof-side apparatus fixed to any of the roof panel, a frame supporting the roof panel and the interior member.

6. A wiring module set, comprising:
a wiring module including: a functional sheet disposed between a roof panel forming a roof part of a vehicle and an interior member forming a ceiling shape of a vehicle interior to planarly extend over the roof panel and the interior member; a transmission member provided to the functional sheet; and a roof-side apparatus provided to the functional sheet, wherein the functional sheet includes a layer having at least one selected from the group consisting of a heat insulation function, an acoustic insulation function, and a radio wave shielding function, and at least one end of the transmission member is provided along a wiring route connected to the roof-side apparatus in the functional sheet; and
the interior member side wiring module including an interior member side transmission member provided to the interior member, wherein
the interior member side transmission member is a member connected to a roof-side apparatus fixed to any of the roof panel, a frame supporting the roof panel and the interior member.

* * * * *